United States Patent [19]

Maruta

[11] Patent Number: 4,719,391
[45] Date of Patent: Jan. 12, 1988

[54] CONVERGENCE CIRCUIT
[75] Inventor: Korehisa Maruta, Tokyo, Japan
[73] Assignee: Denki Onkyo Company, Limited, Tokyo, Japan
[21] Appl. No.: 738,721
[22] Filed: May 29, 1985
[30] Foreign Application Priority Data
    May 30, 1984 [JP] Japan ................ 59-109995
[51] Int. Cl.⁴ .................. H01J 29/70; H01J 29/50
[52] U.S. Cl. ...................... 315/368; 313/412
[58] Field of Search .............. 315/368; 313/412, 428
[56] References Cited
    U.S. PATENT DOCUMENTS 3,784,869  1/1974  Takahashi ................ 315/368
    3,911,295 10/1975  Barkow .................... 307/261
    3,930,185 12/1975  Barkow et al. ............ 315/370
    4,028,586  6/1977  Mengle ................... 315/368
    4,547,707 10/1985  Yabase ................... 315/368

*Primary Examiner*—Theodore M. Blum
*Assistant Examiner*—Gregory C. Issing
*Attorney, Agent, or Firm*—Armstrong, Nikaido, Marmelstein & Kubovcik

[57] ABSTRACT

The convergence circuit has the bridge type rectifying circuit and the first potentiometer parallel-connected to this rectifying circuit and having the slide which is connected to the output terminal at the hot side of the rectifying circuit and moved to alternatively vary the waveform of the correction current of the output of the rectifying circuit every half cycle. On the other hand, the second potentiometer and the series circuit consisting of the resisting means and the correction coils are parallel-connected to the output terminals of the rectifying circuit, and the slide of this potentiometer is connected between the resisting means and the correction coils. The value of current flowing in the correction coil is adjusted by moving the slide and the adjustment of the second potentiometer is optimized by selecting the resistance value of the resisting means.

5 Claims, 8 Drawing Figures

CONVERGENCE CIRCUIT

BACKGROUND OF THE INVENTION

The present invention relates to an improved convergence circuit for correcting a misconvergence which takes place in a multielectron beam cathode-ray tube.

As well known, a color cathode-ray tube in which three electron beams are emitted in an in-line arrangement is widely employed in various electrical appliances such as television receiver sets, video monitors, CRT displays, etc.

A cathode-ray tube is provided with a deflection yoke which deflects three electron beams to the internal fluorescent surface of the cathode-ray tube. In this case, a misconvergence occurs in rasters on the fluorescent surface for a reason attribute to the construction of the cathode-ray tube such as, for example, the curvature of the fluorescent surface, inclination of the electron gun and error of the assembly in manufacture or for a reason attribute to the construction of the deflection yoke such as, for example, a failure in obtaining a desired shape and conductor distribution of the deflection coil. Correction of this kind of misconvergence assumes the use of an independent convergence yoke as described in the U.S. Pat. No. 3,912,970. In case of the in-line type cathode-ray tube, the deflection yoke is required to correct by itself the misconvergence for an economical reason. However, it is difficult to design the deflection yoke in a construction in which no misconvergence takes place. Therefore, the deflection yoke is designed so that a misconvergence of three rasters on the fluorescent surface which are approximately aligned in the vertical direction and parabolic only in horizontal direction remains in the vertical direction Y of screen S as shown in FIG. 1 and a cross misconvergence which takes place at the upper and lower end parts of the screen and which is difficult to be corrected does not remain. In other words, the misconvergence which inevitably takes palce for the design of the deflection yoke is caused with intensive misconvergence value $Y_H$ of the horizontal component from which the component in the Y direction is eliminated.

Such misconvergence can be easily corrected by the correction coil devices 10 and 11 as shown in FIG. 2. These devices 10 and 11 are arranged opposing each other in the direction of in-line arrangement of three electron beams B, G and R at the outside of the cathode-ray tube neck 17. Correction coil devices 10 and 11 comprise U-shaped magnetic cores 10a and 11a and correction coils 10b and 11b which are wound around said magnetic cores. Correction coils 10b and 11b are series-connected to the convergence current source 12 to generate magnetic fluxes 13, 14, 15 and 16 in the arrowhead direction inside the neck 17. Such correction coil devices are described in detail in the U.S. Pat. No. 4,090,110.

Value $Y_H$ of misconvergence which will appear on the screen in the manufacturing processes for television receiver sets, etc. differs with each assembly of the cathode-ray tube and the deflection yoke which are assembled together in the manufacturing processes. Therefore, a amplitude adjusting means which permits correction in response to the magnitude of misconvergence value $Y_H$ is demanded. As shown in FIG. 3, the in-line arrangement of three electron beams is displaced in reference to the X axis of the screen. In this case, the misconvergence value $Y_{H1}$ at the upper end part of the screen differs from the misconvergence value $Y_{H2}$ at the lower end part of the screen and accordingly such misconvergence cannot be corrected only by said amplitude adjusting means. Therefore, a tilt adjusting means which adjusts electron beams B, G and R to correct positions.

SUMMARY OF THE INVENTION

The convergence circuit in accordance with the present invention comprises the rectifying circuit which converts a vertical deflection current into a correction current having the parabolic waveform, the first adjusting means which alternatively changes the waveform of the correction current every half cycle of the vertical deflection current, the second adjusting means which adjusts the value of correction current to be supplied to the correction coils, and a resisting means which is series-connected to the correction coils and optimizes the adjustment by the second adjusting means. The resisting means can be a variable resistor means or a fixed resistor means, and the fixed resistor means is set to a resistance value for optimizing the second adjusting means.

DETAILED DESCRIPTION OF THE INVENTION

Figure 4:
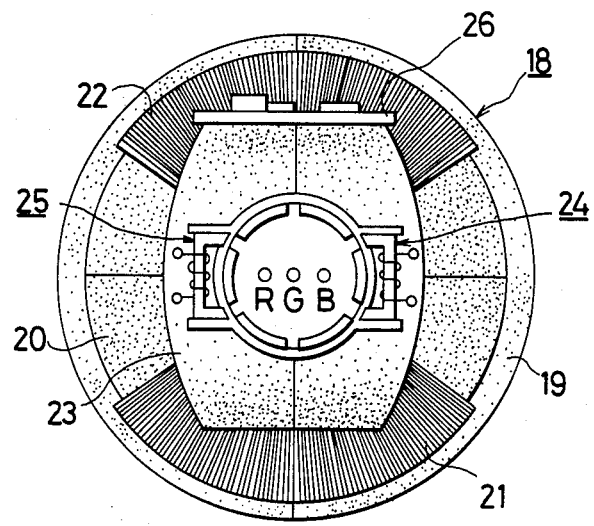
FIG. 4 is a view of the deflection yoke provided with the convergence circuit in accordance with the present invention as viewed from the electron gun side.

In FIG. 4, the deflection yoke 18 is provided with a pair of saddle type horizontal deflection coils, which is not shown, inside a cylindrical coil separator 19 made of plastic material and with a pair of vertical deflection coils which are toroidally wound around the annular deflection core 20 outside the coil separator 19. The coil separator 19 of the deflection yoke 18 is provided with the rear expanded chamber 23 in which the rear end parts of horizontal deflection coils are located. On the outer wall of the expanded chamber 23 at the electron gun side are provided a pair of correction coil devices 24 and 25 at the positions where, in case the deflection yoke 18 is mounted on the cathode-ray tube, the correction coil devices are positioned in the direction of in-line arrangement of three electron beams and symmetrical to the axis of the cathode-ray tube.

Figure 1:
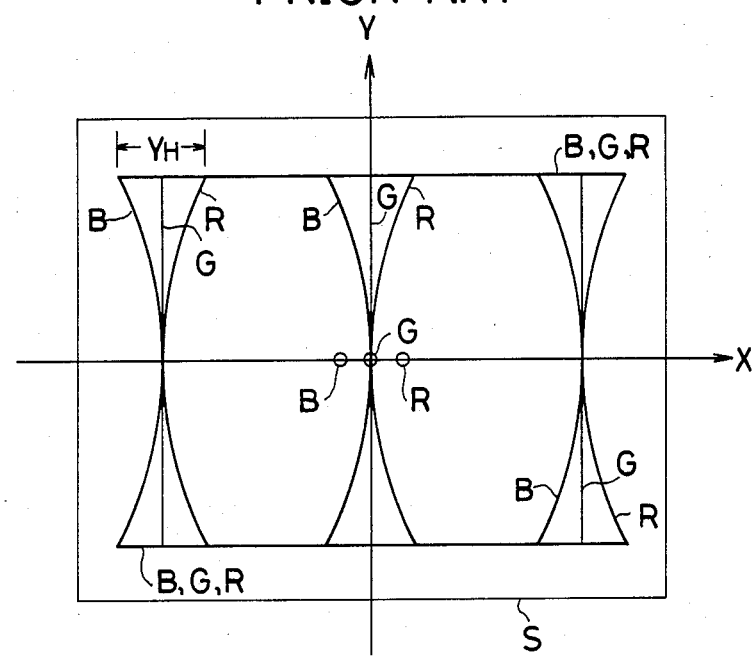
FIGS. 1 and 3 show an example of misconvergence which appears on the screen of the cathode-ray tube in which three electron beams are provided in in-line arrangement.
Figure 5:
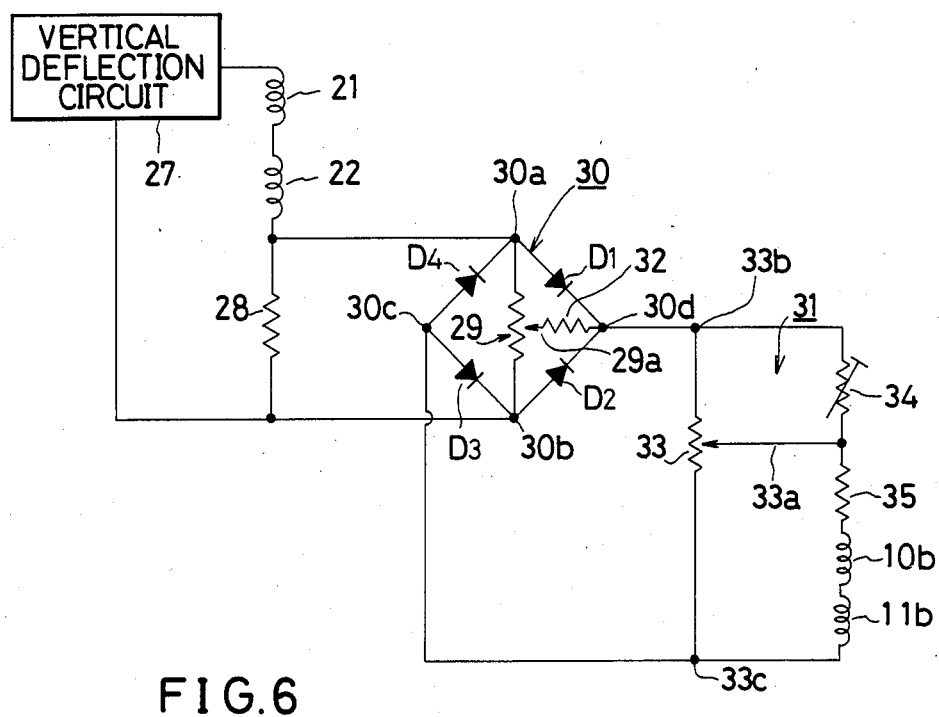
FIG. 5 shows a rough circuitry for illustrating the improved convergence circuit of the present invention.

The top of the expanded chamber 23 is provided with the printed circuit board 26 to which the convergence circuit as shown in FIG. 5. This circuit is described later in this description. The horizontal deflection coils generate a horizontal deflection field and the vertical deflection coils 21 and 22 generate a vertical deflection field. In the present invention, the deflection yoke 18 is adapted so that the misconvergence which appears on the screen of the cathode-ray tube is a misconvergence as shown in FIG. 1. Specifically, three electron beams are converged on the X axis of the screen by adjusting the shapes and a conductor distribution of horizontal deflection coils and the misconvergence $Y_H$ of only the horizontal component in the Y-axis direction of the screen is generated by adjusting the shapes and the conductor distribution of vertical deflection coils.

The deflection yoke purposively generates misconvergence $Y_H$ so that the misconvergence $Y_H$ which inevitably takes place on the screen for the above reason should be a misconvergence which can be easily corrected unlike the cross misconvergence which is difficult to be eliminated.

FIG. 5 shows the convergence circuit which is the main feature of the present invention. The vertical deflection coils 21 and 22 and the resistor 28 are series-connected to the vertical deflection circuit 27. Common input terminals 30a and 30b for the potentiometer and the rectifier circuit 30 are respectively connected to both ends of the resistor 28.

Figure 7A:
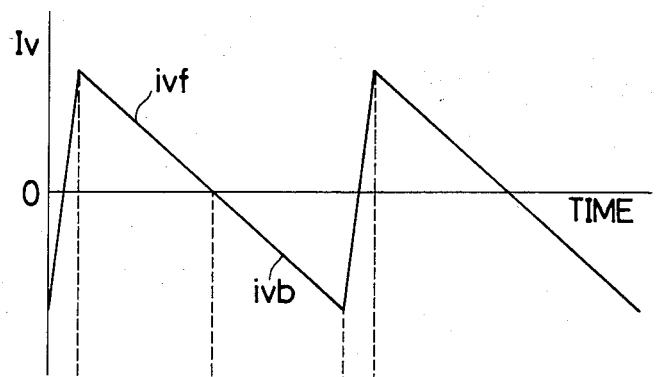
FIG. 7A shows the waveform of the vertical deflection current.
Figure 7B:
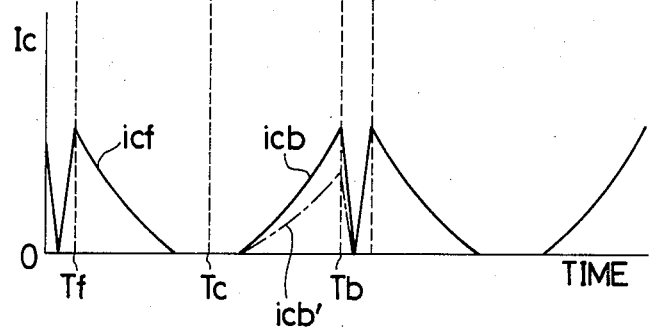
FIG. 7B shows the waveform of the correction current which flows in the correction coils.

The rectifying circuit 30 is formed as the bridge type rectifying circuit employing four diodes D1, D2, D3 and D4 and the correction circuit 31 is connected to output terminals 30c and 30d of the bridge type rectifying circuit and the slide 29a of the potentiometer 29 is connected to the terminal 30d through the resistor 32. This rectifying circuit full-wave rectifies deflection current Iv of sawtooth waveform to be supplied from the vertical deflection circuit 27 as shown in FIG. 7A and converts it to correction current Ic of parabolic waveform as shown in FIG. 7B. The parabolic waveform is formed by the conduction characteristic of the diode and the diode with low offset voltage such as a Schottky diode is used. The cycle of correction current Ic coincides with the cycle of vertical deflection current Iv.

Figure 2:
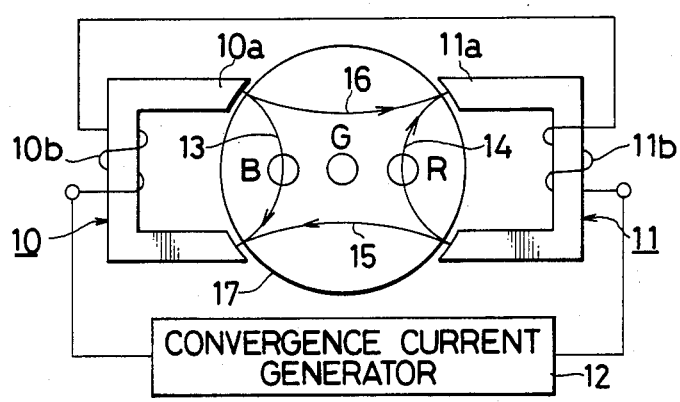
FIG. 2 shows the outline of correction coil devices for use in correction of a conventional type misconvergence as shown in FIG. 1.

The correction circuit 31 comprises the potentiometer 33, variable resistor 34 and correction coils 10b and 11b, and input terminals 33b and 33c of the potentiometer are connected to output terminals 30c and 30d of the rectifying circuit 30. The variable resistor 34 is connected between the slide 33a and the input terminal 33b of the potentiometer 33 while correction coils 10b and 11b are connected between the slide 33a and the input terminal 33c. The resistor 35 indicates the internal resistance the correction coils 10b and 11b have. The following describes the operation of the convergence circuit. The misconvergence $Y_H$ as shown in FIG. 1 takes place on the screen of the cathode-ray tube. In other words, the magnitude of misconvergence is larger toward the upper and lower end parts of the screen. However, correction current Ic of parabolic waveform as shown in FIG. 7b flows in correction coils 10b and 11b. In other words, a large amount of correction current flows in the beginning part Tf and the end part Tb of one cycle and the current at the part Tc of the half cycle is approximately zero. Though the correction field does not take place when the electron beam is scanned at a position near the X axis of the screen, correction fields 13 and 14 shown in FIG. 2 are intensified more toward the upper and lower parts of the screen and electron beams B and R are converged to electron beam G in the full range of the screen. In most cases of assembling the cathode-ray tube and the deflection yoke, the misconvergence value $Y_H$ differs with each assembly. In this case, the alignment is carried out by moving the slide 33a of the potentiometer 33. In other words, current value Ic which flows in correction coils 10b and 11b increases in accordance with the movement of the slide 33a from the position of input terminal 33c to the position of input terminal 33d.

If this current value is varied at a specified rate along with the movement of the slide, correction of the misconvergence in the above-mentioned assembly can be ensured.

Figure 3:
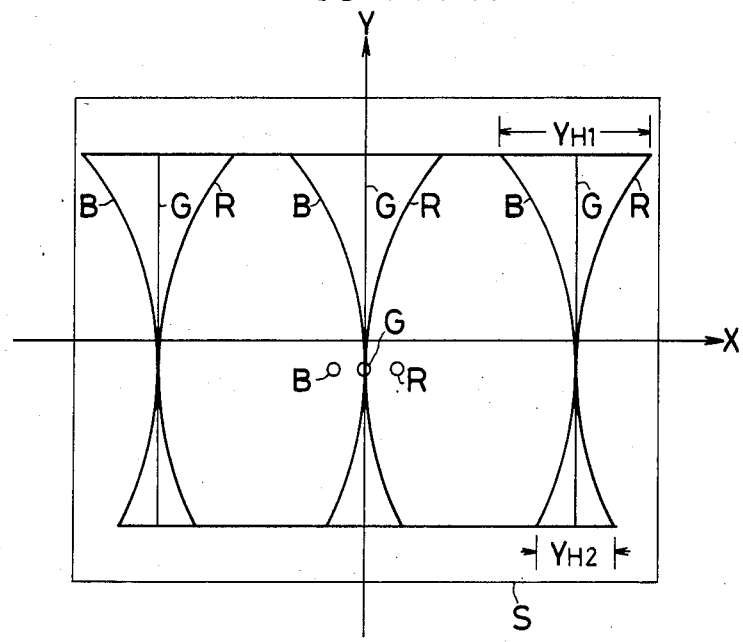
Figure 6:
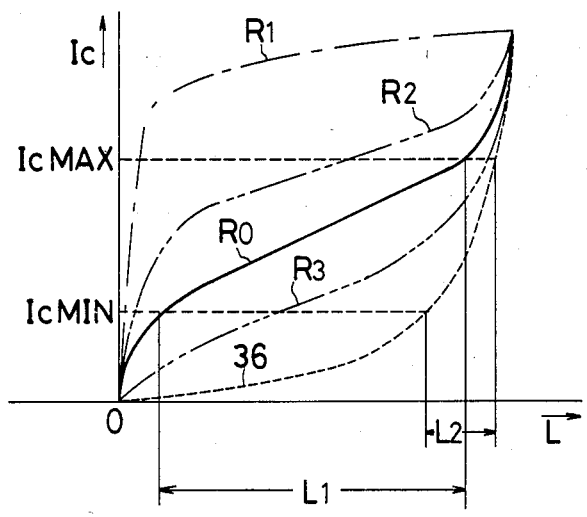
FIG. 6 shows the variations of correction current when the amplitude adjusting potentiometer shown in FIG. 5 and five curves show the characteristics of the correction circuit when the resistance value of the variable resistor series-connected to the correction coils is varied.

FIG. 6 shows the variation of correction current Ic. in reference to movement L of the slide, which is one of features of the present invention. Characteristic curves $R_0$, $R_1$, $R_2$ and $R_3$ show the variations of resistance value R of the variable resistor 34. Curve $R_0$ shown with a solid line shows the characteristic obtained when resistance value R of the variable resistor 34 is set to the optimum value and the deflection yoke is generally adjusted to this optimum value for the standard cathode-ray tube. Curve $R_1$ shows the characteristic when resistance value R is set zero, curve $R_2$ shows the characteristic when resistance value R is set to a smaller value than the optimum value, and curve $R_3$ shows the characteristic when resistance value R is set to the maximum value of variable resistor 34. If the optimum value of variable resistor 34 is known when designing a special type of deflection yoke, the variable resistor 34 can be changed to a fixed resistor for an economical reason. Assuming the maximum value of correction current Ic necessary to correct the misconvergence value $Y_H$ as Ic max and the minimum value as Ic min, the range of movement of the slide 33a of the potentiometer 33 becomes wider as $L_1$. This means that fine adjustment for eliminating the misconvergence $Y_H$ can be carried out. Curve 36 indicated with a broken line shows the characteristic when the variable resistor 34 is removed from the correction circuit 31. In this case, the range of adjustment of the potentiometer 33 is $L_2$. This range is far smaller than $L_1$ and indicates that fine adjustment to eliminate the misconvergence is difficult. On the other hand, a misconvergence asymmetrical to the X axis appears as shown in FIG. 3 due to a displacement of the in-line arrangement of three electron beams. This misconvergence cannot be eliminated by adjustment of the potentiometer 33. Such misconvergence is corrected by adjusting the potentiometer 29 and changing the parabolic waveform of correction current Ic. In other words, correction current Ic passing through the diode $D_2$ of rectifying circuit 30 is divided at the output terminal 30d into a current to be supplied to the input terminal 33b of the correction circuit 31 and a current which flows from the slide 29a to the input terminal 30a through the resistor 32 in case of the negative half-wave component ivb of vertical deflection current Iv shown in FIG. 7A, that is, when the lower half of the screen is scanned. The percentage of the current to be divided will be larger in accordance with movement of the slide 29a toward the input terminal 30a. Consequently, the current flowing through correction coils 10b and 11b does not show a variation of waveform icf at time Tf−Tc as shown in FIG. 7b and the waveform icb at time Tc−Tb becomes current icb' having a small peak value as shown with a one-dot broken line. Asymmetrical misconvergence is corrected by this correction current.

When the pattern of asymmetrical misconvergence appears in a reverse pattern to that in FIG. 3, the slide 29a of potentiometer 29 is moved to the input terminal 30b. In case of the positive half-wave component ivf of deflection current Iv, correction current Ic which has passed through diode $D_1$ is divided into a current to be supplied to the input terminal 33b and a current which flows from the slide 29a to the input terminal 30b through the resistor 32.

Consequently, the waveform icf at time Tf−Tc of correction current Ic is varied and the misconvergence is corrected. The resistor 32 is provided to avoid a sudden variation of impedance due to adjustment of the potentiometer 29.

If the degree of asymmetricity of misconvergence is large, the degree of correction can be increased by removing the resistor 32.

The misconvergence which inevitably occurs due to assembly of the cathode-ray tube and the deflection yoke can be effectively corrected over the full range of the screen. Thus, the deflection yoke can be easily designed and the yield rate in manufacturing of the deflection yokes can be greatly improved.

What is claimed is:

1. An improved convergence circuit for correcting a misconvergence which takes place in a cathode ray tube in which three electron beams are emitted in an in-line arrangement, said circuit comprising:
   (a) a pair of vertical deflection coils supplied with a deflection current having a sawtooth waveform from a vertical reaction circuit;
   (b) a rectifying circuit which is formed as a bridge circuit having a pair of input terminals series-connected to said coils and a pair of output terminals, said rectifying circuit converting said deflection current to a correction current having a parabolic waveform;
   (c) a first adjusting means for alternatively varying the parabolic waveform of said correction current every half cycle of said deflection current;
   (d) a series circuit which comprises resisting means and a correction coil and is connected across said output terminals of said rectifying circuit, said correction coil generating a magnetic correction field for correcting the misconvergence;
   (e) a second adjusting means which has a slide connected between said correction coil and said resisting means and is connected to said output terminals to adjust a value of correction current which flows in said correction coil by the movement of said slide; and
   (f) wherein said resisting means further operates to extend a range of movement of said slide, thereby enabling fine adjustment to eliminate said misconvergence.

2. A convergence circuit in accordance with claim 1, wherein said first adjusting means has a potentiometer, with input terminals connected to the input terminals of said rectifying circuit and the slide of the potentiometer is connected to the hot potential side output terminal of said rectifying circuit through a connecting means, whereby said correction circuit is alternatively divided every half cycle of said deflection current.

3. A convergence circuit in accordance with claim 2, wherein said connecting means includes a fixed resistor.

4. A convergence circuit in accordance with claim 1, wherein said resisting means comprises a variable resistor and a pattern of adjustment by said second adjusting means is optimized by varying the resistance value of said resistor.

5. A convergence circuit in accordance with claim 1 wherein said resisting means is a fixed resistor which fixes a range of adjustment of said second adjusting means.

* * * * *